United States Patent [19]

Muller et al.

[11] Patent Number: 5,026,235
[45] Date of Patent: Jun. 25, 1991

[54] CLASP-LIKE SHEET METAL NUT

[75] Inventors: Klaus Muller, Weil-Haltingen; Uwe Motsch, Rheinfelden; Gerhard Mack, Reinfelden-Adelhausen, all of Fed. Rep. of Germany

[73] Assignee: A. Raymond, Lorrach, Fed. Rep. of Germany

[21] Appl. No.: 502,827

[22] Filed: Apr. 2, 1990

[30] Foreign Application Priority Data

Mar. 31, 1989 [DE] Fed. Rep. of Germany ....... 3910423

[51] Int. Cl.⁵ .............................................. F16B 21/18
[52] U.S. Cl. ..................................... 411/523; 411/175
[58] Field of Search ................... 411/174, 175, 84, 85, 411/104, 285, 290, 291, 523, 524

[56] References Cited

U.S. PATENT DOCUMENTS 2,255,469  9/1941  Kost ..................................... 411/175
2,771,113  11/1956  Flora ................................. 411/175 X
4,508,477  4/1985  Oehlke et al. ........................ 411/174

FOREIGN PATENT DOCUMENTS 3536473  4/1987  Fed. Rep. of Germany .
3542841  6/1987  Fed. Rep. of Germany .
2522747  9/1983  France ................................. 411/175

Primary Examiner—Rodney M. Lindsey
Assistant Examiner—Jerry Redman
Attorney, Agent, or Firm—Finnegan, Henderson, Farabow, Garrett & Dunner

[57] ABSTRACT

A clasp-like sheet metal nut for automatic fitting onto a support plate comprising a threaded leg, which has a thread profile, and a clasp leg, which is connected to said threaded leg via a cross-piece and is provided with a screw through-hole, the two legs running at an angle toward each other in the direction of their free ends and the free end of the threaded leg having an insertion plate protruding obliquely away from the clasp leg, wherein laterally outward-protruding guide fins are formed on one of the two legs.

8 Claims, 3 Drawing Sheets

FIG. 1
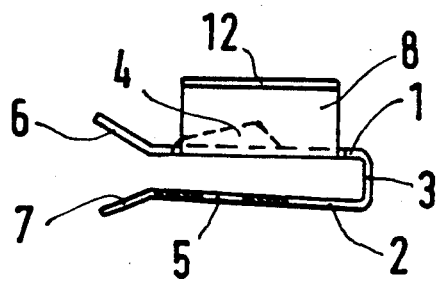
FIG. 2
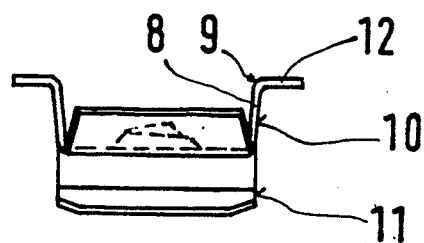
FIG. 3
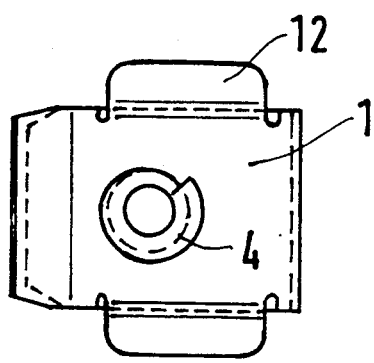
FIG. 4
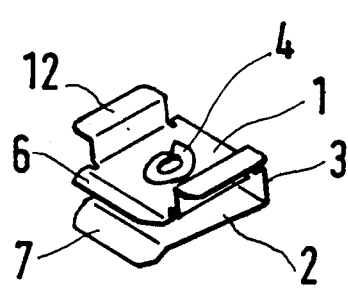
FIG. 5A
FIG. 5B
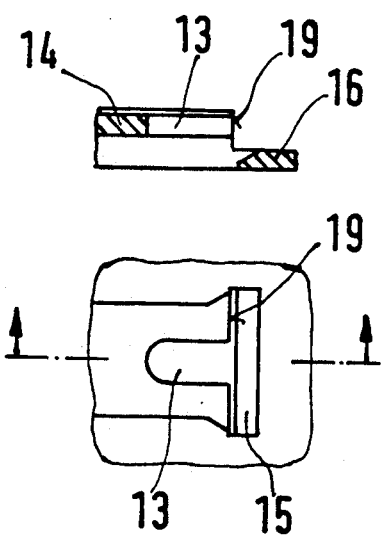
FIG. 6A
FIG. 6B
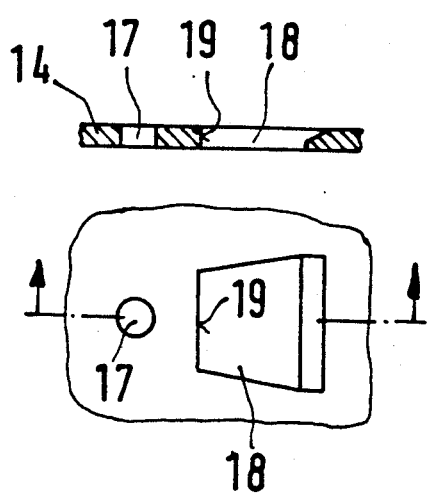

CLASP-LIKE SHEET METAL NUT

BACKGROUND OF THE INVENTION

The invention relates to a clasp-like sheet metal nut which is suitable for automatic fitting onto a support plate by means of a fitting head which can be brought up to the fastening point. These sheet metal nuts are used in the automobile industry as well as in the household appliances industry and other branches of industry, in order to screw components in plate form to other components. For this purpose, the sheet metal nut is pushed onto the edge of a support plate provided with a hole, until threaded hole and plate hole coincide.

U.S. Pat. No. 4,793,753 discloses such a sheet metal nut which has, for the purpose of automatic fitting, guide lugs formed on the two side edges of the threaded leg at right angles to the plane of the leg, the upper edges of which guide lugs project at least beyond the thread profile and the mutually parallel surfaces of which guide lugs have the same spacing from each other as the side edges of the clasp leg. Thanks to the guide lugs, this sheet metal nut can be conveyed without any problems through a flexible guide channel of rectangular cross section even over considerable distances and guided reliably into the retaining head of a fitting apparatus, likewise known from this publication, the cross-piece between the two legs offering the necessary air impingement surface for the compressed-air conveyance in the guide channel. This known sheet metal nut has proved very successful in conjunction with the associated fitting apparatus wherever the retaining head of the fitting apparatus can be brought freely and unhindered up to the edge of the support plate.

However, in motor vehicle construction, for example on dashboards or other complicated housing walls, there are fastening points which do not lie at the edge of the support plate but in the middle of it, the fastening hole having in front of it a rectangular clearance for inserting the clasp-like sheet metal nut. This clearance is usually just big enough for the sheet metal nut to be introduced with the hanging clasp leg into the clearance obliquely from above and then pushed underneath the edge of the plate.

SUMMARY OF THE INVENTION

The object of the invention is to design the clasp-like sheet metal nut in such a way that, by means of a correspondingly designed fitting apparatus, said nut can be set, or pushed in, automatically even at such difficultly accessible fastening points. According to the invention, this object is achieved by the sheet metal nut described at the beginning having laterally outward protruding guide fins formed on one of the two legs. This offers the possibility of holding the sheet metal nut in the retaining head of the fitting apparatus at the fins in such a way that a leg hanging freely down from the guideway of the retaining head can be inserted into the fitting clearance.

If sheet metal nuts in clasp form with guide lugs formed laterally on the threaded leg, known from U.S. Pat. No. 4,793,753 are used, according to a further feature of the invention it is advantageous if the protruding guide fins are formed on the upper edges of the guide lugs parallel to the plane of the threaded leg. As a result, the guide fins are at a height above the threaded leg which offers more space for the formation of the lateral guide walls in the guide channel and, in addition, thanks to the guide lugs, also permits an optimum embedding in the guide channel.

If, on the other hand, the clasp-like sheet metal nuts with securing leg above the threaded leg, known from U.S. Pat. No. 4,714,392 are used, in this case there is, in a further development of the invention, the advantageous possibility of forming the guide fins on the outer lugs of the securing leg, so that the only allowance which still has to be made in the case of the metal strip necessary for production is the cut-to-size width for the fins, and therefore a substantially smaller metal strip width is required in comparison with the above-mentioned embodiment.

This aspect of material saving comes to bear even more if, in a further development of the above-mentioned design features, it is ensured that the outer edges of the guide fins run parallel to each other and have the same spacing as the side edges of the threaded leg and of the clasp leg. This gives the securing leg with the fins the same width as the two other legs, so that no additional strips of punched scrap are generated. Moreover, the further advantage is obtained that the flexible guide tube required for the transport of the sheet metal nut to the fitting apparatus can be given a rectangular cross section, adapted to the outer contour of the sheet metal nut, because the guide grooves are only required in the region of the retaining head, which simplifies the production of the guide tube and ensures its guiding behavior even if curved quite acutely.

DESCRIPTION OF THE DRAWINGS

The embodiments of the invention specified in the claims are explained in further detail below and are represented in the drawings, in which:

FIG. 1 shows a preferred embodiment of the sheet metal nut accord to the invention in an enlarged side view;

FIG. 2 shows the same sheet metal nut in front view;

FIG. 3 shows the same sheet metal nut in plan view;

FIG. 4 shows the same sheet metal nut in perspective representation;

FIGS. 5A and B show a fastening point provided for the sheet metal nut, in section and in plan view;

FIGS. 6A and B show another fastening point in section and in plan view;

DETAILED DESCRIPTION OF THE INVENTION

Figure 7:
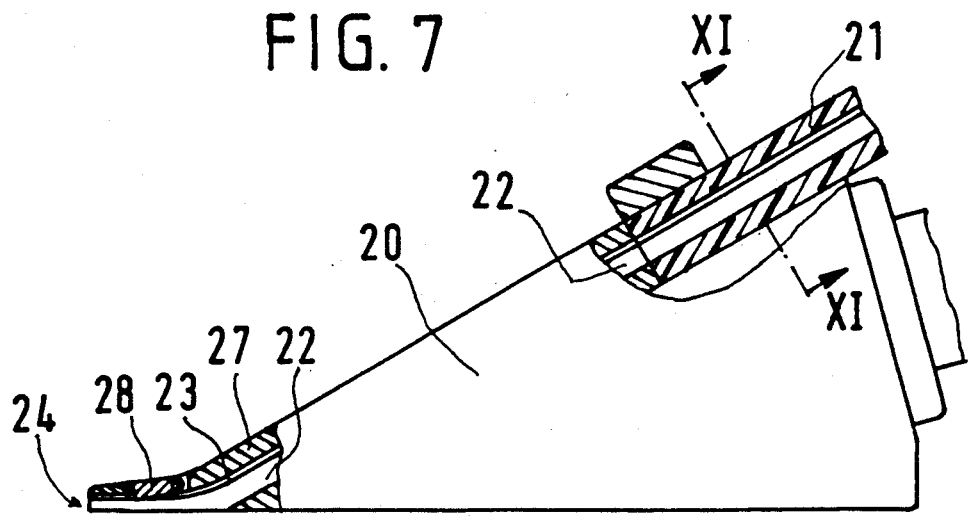
FIG. 7 shows a retaining head of a fitting apparatus suitable for setting the sheet metal nut, with partial section through the exit end and the guide channel.

The sheet metal nut shown in FIGS. 1-4 consists of a threaded leg 1 and a clasp leg 2, connected to the latter via a cross-piece 3. The threaded leg 1 has in the middle a thread profile 4 and the clasp leg 2 is provided with a through-hole 5, precisely underneath said thread profile 4. The two legs 1 and 2 run at an angle toward each other in the direction of their free ends and have at their ends insertion plates 6 and 7 protruding obliquely away from each other.

Guide lugs 8 are formed on both sides edges of the threaded leg 1 at right angles to the plane of the leg, the upper edges 9 of which guide lugs project at least beyond the thread profile 4 and the insertion plate 6. The outer surfaces 10 of the guide lugs 8 in this case expediently have the same spacing from each other as the side edges 11 of the clasp leg 2, so that the sheet metal nut is guided well in the guide channel, still to be described (see FIG. 9). In addition, guide fins 12, with which the sheet metal nut can be conveyed securely in the retaining head 20, described below, of a fitting apparatus and held firmly there during pressing onto a fastening point (FIG. 8), are formed on the upper edges 9 of the guide lugs 8 and are also parallel to the plane of the threaded leg 1.

In FIGS. 5 and 6, two such fastening points are represented, which do not lie at the edge but in the middle of a housing wall and are to be fitted with a sheet metal nut. In the case of FIG. 5, the fastening point is formed in a support place 14 as a slot 13 which is open to one side and in front of which there is an elongated clearance 15 for inserting the clasp leg of a sheet metal nut. The adjoining housing wall 16 is in this case set back a little, in order that the clasp leg can be inserted without any problems. In the case of FIG. 6, on the other hand, there is in front of a fastening hole 17 a somewhat broader clearance 18, which converges trapezoidally for easier insertion of the clasp leg. In both cases, when setting, the sheet metal nut must be inserted obliquely from above (cf. FIG. 12) and then pressed horizontally against the edge 19 in front of the fastening hole 13, or 17 (cf. FIG. 13).

Figure 11:
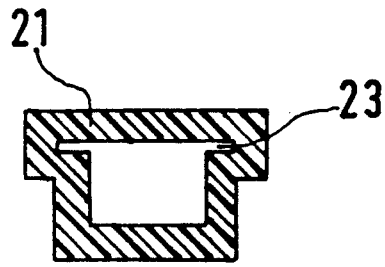
FIG. 11 shows a cross section through the profile of the guide channel, according to line XI—XI in FIG. 7.

FIG. 7 shows a retaining head 20 of a fitting apparatus (not shown), which head is particularly suitable for automatic setting of the sheet metal nut according to the invention. The sheet metal nuts are in this case brought up via a flexible guide tube 21 of the profile cross section (FIG. 11) corresponding to the contours of the sheet metal nut and, in the retaining head 20, transferred to a guide channel 22 of the same profile cross section, guide grooves 23 being provided in the upper corners of the guide tube 21—as well as the guide channel 22—for sliding-through of the guide fins 12. This guide channel 22 is brought with its guide grooves 23 obliquely from above up to the exit end 24 of the retaining head 20 and then diverted in a gentle arc into the horizontal exiting direction, the guide channel 22 being open downward at the exit end 24. There, the sheet metal nut which has been brought up is stopped and firmly held by means described below, the clasp leg 2 of the sheet metal nut hanging out freely downward. In this position, the sheet metal nut can, as graphically shown in FIGS. 12 and 13, be inserted obliquely with the retaining head 20 into the fitting clearance 18 of the support plate 14 and then pressed forward horizontally until in the fastening position. Then, after releasing the stoping means, the retaining head 20 can be drawn out rearward and fitted with a new sheet metal nut for the next fastening point.

Figure 8:
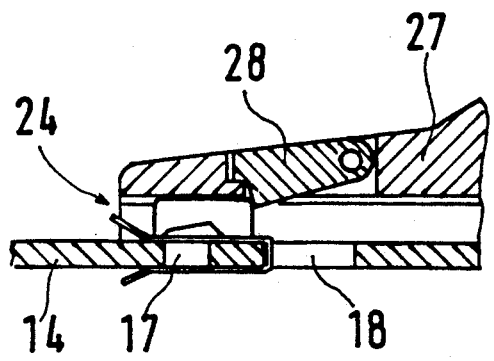
FIG. 8 shows an enlarged representation of the retaining head at and end, in vertical longitudinal section.
Figure 9:
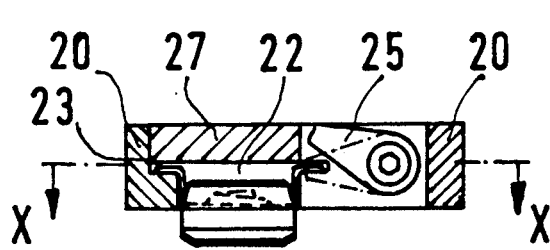
FIG. 9 shows a cross section of this, according to line IX—IX in FIG. 10.
Figure 10:
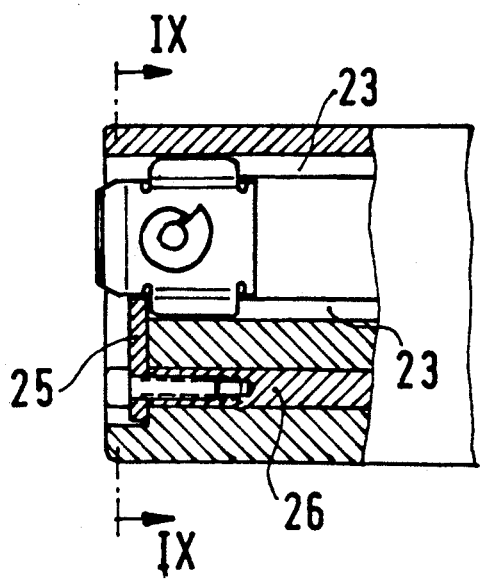
FIG. 10 shows a horizontal section of this, according to line X—X in FIG. 9.

FIGS. 8-10 show how a sheet metal nut is stopped and held firmly at the exit end 24 of the fitting apparatus. The stoping is performed by a lock bolt 25, which is arranged on the end of the guide channel 22 and to one side of the latter, is mounted on a pivot axis 26 and. It for closing the exit opening, is swung into the guide groove 23. After setting the sheet metal nut, said lock bolt 25 is swung up and thereby clears the path again for the guide fins 12, so that the retaining head 20 can be withdrawn unhindered.

Figure 12:
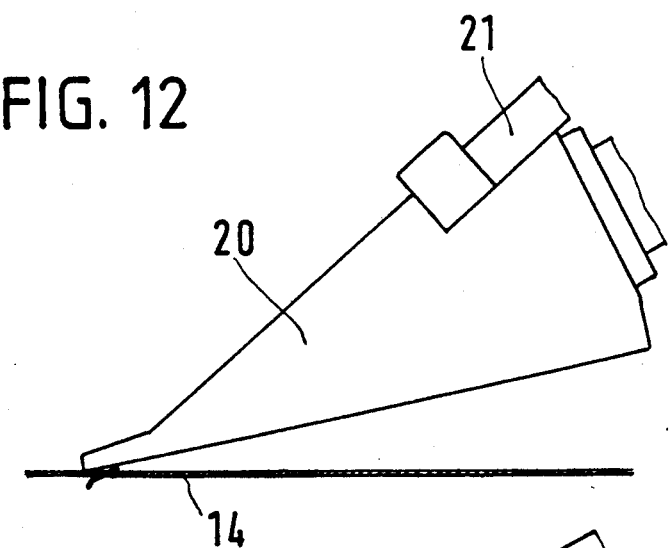
FIGS. 12 and 13 show the work sequence when setting a sheet metal nut, according to the invention.
Figure 13:
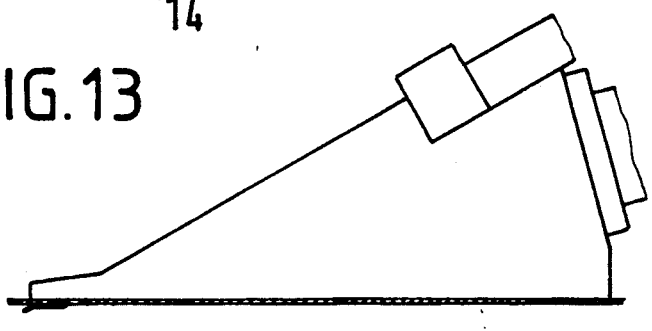

For firmly holding the sheet metal nut which is inserted, a lock pawl 28, mounted pivotally about a horizontal transverse axis, is also provided in the upper transverse wall 27 of the guide channel 22. Said lock pawl 28 is initially swung up by the sheet metal nut brought up and, as soon as the sheet metal nut strikes the lock bolt 25, drops again into its locking position, so that the sheet metal nut is supported from the rear when it is pushed by the retailing head 20 into the fastening point (FIGS. 12 and 13).

Figure 14:
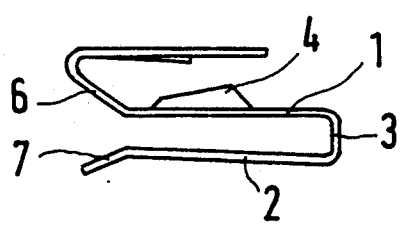
FIG. 14 shows another embodiment of the sheet metal nut according to the invention, in an enlarged side view.
Figure 15:
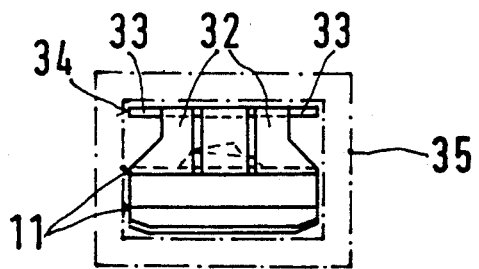
FIG. 15 shows the same sheet metal nut in front view.
Figure 16:
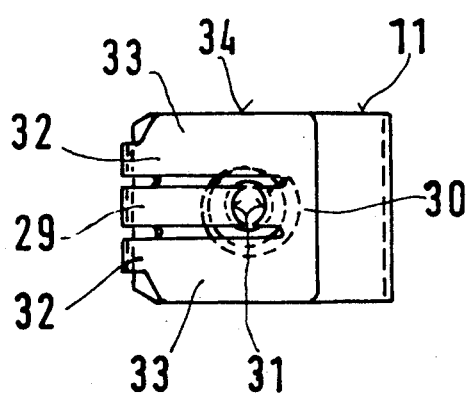
FIG. 16 shows the same sheet metal nut in plan view.

In FIGS. 14 to 16, another embodiment of the sheet metal nut according to the invention is shown, in which a securing leg 29/30, which is bent around toward the thread profile 4 in the form of a C, is formed on the upper end of the insertion plate 6. As explained in further detail in German Offenlegungsschrift 3,536,473, said securing leg is provided with arcuate clamping edges 31, which are intended for securing the threaded shank of a screwed-in screw.

In the case of this sheet metal nut, two guide fins 33, the outer edges 34 of which run parallel to each other and expediently have the same spacing from each other as the side edges 11 of the threaded leg 1 or of the clasp leg 2, are formed on the outer lugs 32 of the securing leg 30 which lead past the clamping edges 31.

This design of the guide fins 33 has the advantage that the guide grooves 23 can be dispensed with where the sheet metal nuts are brought into place, so that the flexible guide tube 35 provided for this purpose can, as indicated by dot-dashed lines in FIG. 15, be designed with a rectangular profile cross section. As a result, the tube 35 is simpler in production and also less prone to bending. The guide grooves 23 are not required until virtually in the lower part of the retaining head 20, as from the region in front of the deflection, in order to bring the sheet metal nuts up to the exit point 24 in a hanging manner. In addition, in the case of this embodiment there is a significant material saving in comparison with the embodiment first described, for which a correspondingly wide metal strip is required for the production of the sheet metal nuts on account of the laterally projecting or protruding guide lugs 8 and guide fins 12, and therefore correspondingly wide strips of punched waste are also generated in continuous production.

The guide fins according to the invention are not restricted to clasp-like sheet metal nuts but can be provided on all types of sheet metal clasps or securing clasps wherever said clasps are to be fed and assembled automatically in the same way.

What is claimed:

1. A sheet-metal nut comprising a thread leg having a thread portion therein for receipt of a threaded member, a clasp leg having a through hole in line with said thread portion and integrally connected at one end to one end of the thread leg by a cross-piece to form a C-shaped structure, said legs inclining toward each other in the direction of their free ends opposite their said one ends, an insertion plate that inclines forwardly and upwardly from said free end of the thread leg away from said clasp leg, a pair of guide lugs integrally connected with respect to and projecting away from one of said legs in a direction remote from the other of said legs, each of said lugs having at their remote end a guide fin that is spaced from and projects laterally outwardly in a direction substantially parallel to the plane of said one leg.

2. The sheet-metal nut of claim 1, where the guide lugs project upwardly from said thread leg.

3. The sheet-metal nut of claim 2, wherein said clasp leg and said thread leg each having two lateral side edges, the lugs extending upwardly from the side edges of and at right angles to the plane of the thread leg, said lugs having upper edges that extend above the thread portion and outer side surfaces aligned with the side edges of the clasp leg, said guide fins extending outwardly from said upper edges beyond the edges of said legs and parallel with the plane of the thread leg.

4. The sheet-metal nut of claim 3, wherein the thread leg inclines toward the clasp leg.

5. The sheet-metal nut of claim 2, wherein the guide lugs project upwardly from the forward end of the insertion plate above the thread portion of the thread leg, said guide lugs having upper ends and said guide fins being connected to the upper ends of the lugs and extending back over the thread leg toward said crosspiece to form an S-shaped structure to the nut.

6. The sheet-metal nut of claim 5, wherein said clasp leg and said thread leg each have two lateral side edges aligned with each other, and said lugs and fins each having outer side edges, the outer side edges of said lugs being spaced inwardly from the side edges of the legs with the outer side edges of the fins being parallel to each other and aligned with the lateral side edges of said legs.

7. The sheet-metal nut of claim 6, wherein the thread leg inclines toward the clasp leg.

8. The sheet-metal nut of claim 6, wherein the guide fins are connected to each other to form a securing leg, said securing leg having a pair of opposed arcuate clamping edges in line with said thread portion and said through-hole for receipt of the threaded member.

* * * * *